United States Patent
Lepp et al.

(10) Patent No.: US 11,657,704 B2
(45) Date of Patent: May 23, 2023

(54) EVENT DATA COLLECTIONS FOR ACCIDENTS

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB); Gordon Peter Young, Kineton (GB); Jasmin Mulaosmanovic, Kitchener (CA)

(73) Assignee: BlackBerry Limited, Waterloo (CA)

( * ) Notice: Subject to any disclaimer, the term of this patent is extended or adjusted under 35 U.S.C. 154(b) by 301 days.

(21) Appl. No.: 16/829,785

(22) Filed: Mar. 25, 2020

(65) Prior Publication Data

US 2021/0304592 A1 Sep. 30, 2021

(51) Int. Cl.
  *G08G 1/01* (2006.01)
  *H04W 4/90* (2018.01)
  *H04W 4/40* (2018.01)
  *G07C 5/00* (2006.01)

(52) U.S. Cl.
  CPC ......... *G08G 1/0112* (2013.01); *G07C 5/008* (2013.01); *G08G 1/0116* (2013.01); *H04W 4/40* (2018.02); *H04W 4/90* (2018.02)

(58) Field of Classification Search
  CPC ..... G08G 1/0112; G08G 1/0116; H04W 4/90; H04W 4/40; G07C 5/008
  USPC ...................................................... 701/117
  See application file for complete search history.

(56) References Cited

U.S. PATENT DOCUMENTS

| | | | |
|---|---|---|---|
| 7,536,247 B2* | 5/2009 | Clark | B60R 21/01332 701/45 |
| 9,773,281 B1* | 9/2017 | Hanson | H04W 4/023 |
| 10,145,684 B1* | 12/2018 | Tofte | G06V 20/10 |
| 10,558,224 B1* | 2/2020 | Lin | G05D 1/0285 |
| 2010/0114418 A1* | 5/2010 | Samuel | G08G 1/167 701/301 |
| 2010/0114467 A1* | 5/2010 | Samuel | G08G 1/162 701/119 |
| 2013/0086109 A1* | 4/2013 | Huang | G06F 16/487 707/E17.014 |
| 2014/0156104 A1* | 6/2014 | Healey | G07C 5/00 701/1 |
| 2016/0173882 A1* | 6/2016 | Mishra | H04N 19/426 375/240.08 |
| 2016/0202074 A1* | 7/2016 | Woodard | G06Q 10/047 701/465 |
| 2016/0283962 A1* | 9/2016 | Chan | G06Q 30/0222 |
| 2017/0187994 A1* | 6/2017 | Tatourian | H04N 7/185 |
| 2018/0206089 A1* | 7/2018 | Cavalcanti | H04W 48/16 |
| 2018/0227726 A1* | 8/2018 | Futaki | H04W 4/02 |

(Continued)

OTHER PUBLICATIONS

SAE International, Surface Vehicle Standard, J2945™/1, On-Board System Requirements for V2V Safety Communications, Mar. 2016 (127 pages).

(Continued)

*Primary Examiner* — Kerri L McNally
*Assistant Examiner* — Thang D Tran
(74) *Attorney, Agent, or Firm* — Trop, Pruner & Hu, P.C.

(57) ABSTRACT

In some examples, a system detects an accident involving a first vehicle, and responsive to the detecting of the accident, collects event data relating to the accident from a second vehicle that is different from the first vehicle.

16 Claims, 5 Drawing Sheets

(56) References Cited

U.S. PATENT DOCUMENTS

| | | | |
|---|---|---|---|
| 2018/0233042 A1* | 8/2018 | Zhang | G06V 10/75 |
| 2018/0255562 A1* | 9/2018 | Cho | H04W 12/06 |
| 2018/0286235 A1* | 10/2018 | Fujisawa | G08B 25/00 |
| 2018/0308344 A1* | 10/2018 | Ravindranath | G08B 27/001 |
| 2019/0012908 A1* | 1/2019 | Chun | G08G 1/04 |
| 2019/0028862 A1* | 1/2019 | Futaki | H04W 92/18 |
| 2019/0140850 A1* | 5/2019 | Ambrosin | H04L 9/0869 |
| 2019/0261171 A1* | 8/2019 | Cozzetti | H04W 12/108 |
| 2019/0294167 A1* | 9/2019 | Kutila | G01C 21/3461 |
| 2019/0364424 A1* | 11/2019 | Vanderveen | H04L 61/5053 |
| 2020/0120505 A1* | 4/2020 | Kim | H04W 4/44 |
| 2020/0126416 A1* | 4/2020 | Montemurro | G08G 1/0112 |
| 2020/0132502 A1* | 4/2020 | Beaurepaire | G01C 21/3492 |
| 2020/0160722 A1* | 5/2020 | Brugman | G07C 5/08 |
| 2020/0192355 A1* | 6/2020 | Lu | G08G 1/205 |
| 2020/0196120 A1* | 6/2020 | Uchiyama | H04W 4/40 |
| 2020/0258328 A1* | 8/2020 | Gawthorpe | G08G 1/0112 |
| 2020/0334980 A1* | 10/2020 | Ludwig | H04W 4/44 |
| 2021/0026360 A1* | 1/2021 | Luo | G05D 1/0088 |
| 2021/0241624 A1* | 8/2021 | Kan | G08G 1/0175 |
| 2021/0266867 A1* | 8/2021 | Das | H04W 4/46 |
| 2022/0039080 A1* | 2/2022 | Khoryaev | H04W 72/0406 |
| 2022/0073104 A1* | 3/2022 | Lee | G08G 1/04 |
| 2022/0120585 A1* | 4/2022 | Max | B60W 40/10 |

OTHER PUBLICATIONS

IEEE Standard for Wireless Access in Vehicular Environments (WAVE)—Networking Services, IEEE Vehicular Technology Society, IEEE Std 1609.3™—2016 (160 pages).

Bosch Diagnostics, Bosch CDR downloaded Mar. 1, 2020 (2 pages).

CVRIA, Connected Vehicle Reference Implementation Architecture, https://local.iteris.com/cvria/ downloaded last updated Jun. 23, 2017 (1 page).

Stone, Tom, CVRIA, USDOT updates its Connected Vehicle Reference Implementation Architecture, May 11, 2016 (2 pages).

Wikipedia, Event data recorder last edited Feb. 29, 2020 (9 pages).

Veitas et al., In-vehicle data recording, storage and access management in autonomous vehicles, Feb. 25, 2018 (21 pages).

European Commission (https://ec.europa.eu/commission/index) Intelligent Transport Systems, The Interoperable EU-wide eCall last updated Jan. 3, 2020 (6 pages).

\* cited by examiner

EVENT DATA COLLECTIONS FOR ACCIDENTS

BACKGROUND

Vehicles traveling on roadways may be involved in accidents. An accident can involve a single vehicle or multiple vehicles. For example, a vehicle may run off a roadway and collide with a building, a traffic sign or light, a pedestrian, or other objects. In other examples, multiple vehicles may collide with one another. In further examples, non-vehicular objects including environmental items (e.g. loose animals, or snow or mud slides) or other objects can cause accidents to moving and/or stationary vehicles. Additionally, such incidents may be witnessed by vehicles not directly impacted or involved in the accident, where the witnessing may include detection and recording by electrical systems or devices on or associated with the vehicle.

Once an accident involving a vehicle occurs, an accident reconstruction can be performed for determining the cause of the accident, who is at fault, or for another purpose. Traditionally, accident reconstruction has relied upon human collection of statements made by witnesses, which can include drivers of vehicles, passengers of vehicles, and/or bystanders. The statements made by witnesses can be compared to other evidence relating to the accident, including the locations and positions of the vehicle(s,) the specific damage of the vehicle(s), skid marks on roadways, damage to other objects, and so forth. Such vehicle reconstruction techniques may not be reliable and can be labor-intensive and time-consuming. In addition, with the advent of autonomous driving and the use of automated systems to aid vehicle driving or control, the decision point or trigger may occur much later than in a human only vehicle or system, and ultimately the observed movement or action of the vehicle may be deliberately later and hence not as expected by the human witness, making their testimony unreliable in regards to the analysis of the accident.

BRIEF DESCRIPTION OF THE DRAWINGS

Some implementations of the present disclosure are described with respect to the following figures.

Figure 1:
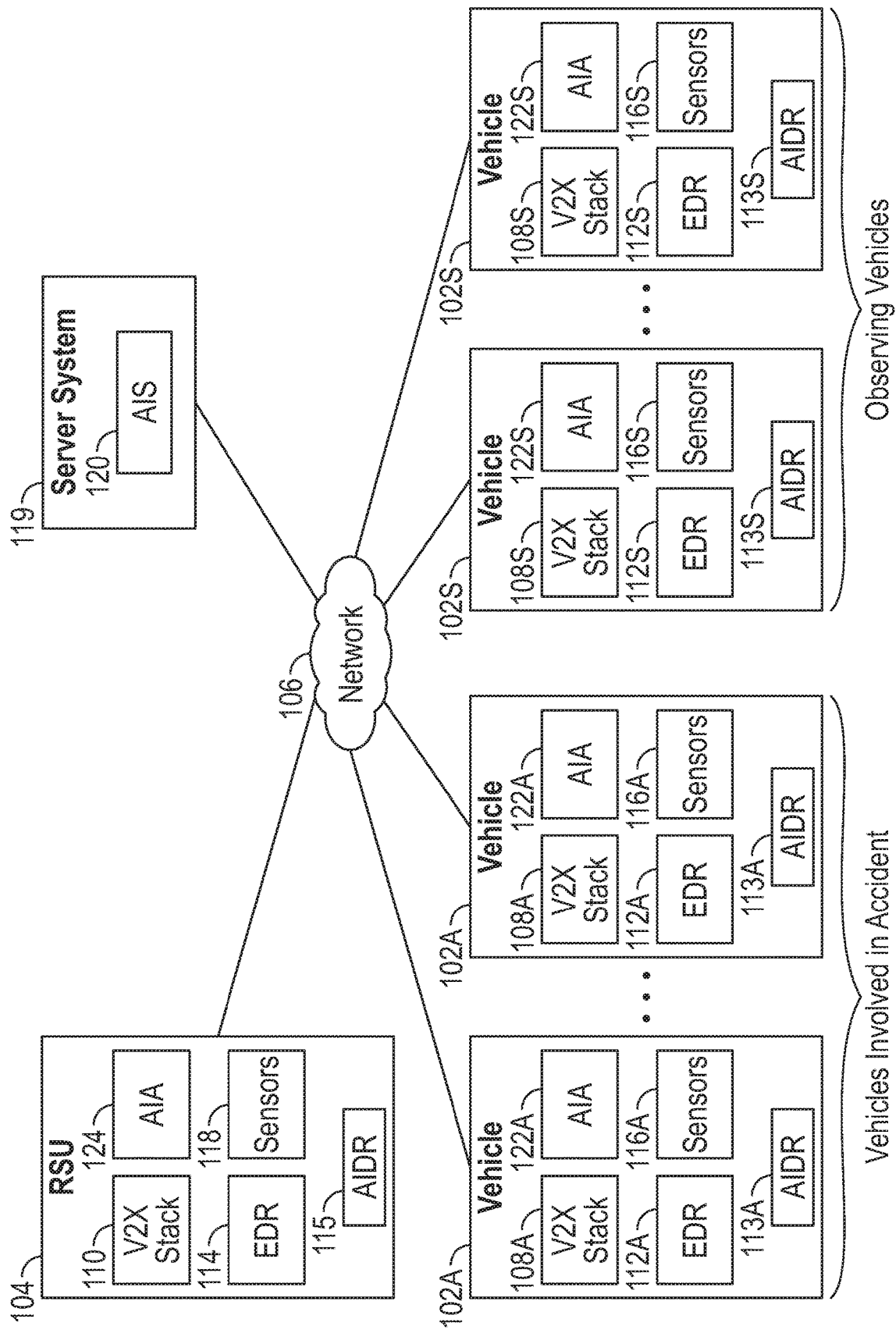
FIG. 1 is a block diagram of an example arrangement that includes vehicles, a roadside unit (RSU), and an accident information service (AIS), in accordance with some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., space planes, space shuttles, space capsules, space stations, satellites, etc.), watercraft (e.g., ships, boats, hovercraft, submarines, etc.), railed vehicles (e.g., trains and trams, etc.), pedestrians (electronic devices carried by the pedestrians, such as a mobile device or other personal device) and bicycles and other types of vehicles including any combinations of any of the foregoing, whether currently existing or after arising.

An "accident" can refer to an incident in which a vehicle (or multiple vehicles) is (are) involved in an occurrence in which damage or injury was caused to a vehicle, objects around the vehicle, and/or a person. A challenge associated with investigating an accident is collecting reliable and comprehensive information leading up to the accident. In addition to statements from witnesses and physical evidence that can be gathered from the damaged vehicle(s) and surrounding objects, as well as from skid marks on a roadway, event data can also be obtained from an event data recorder in the vehicle(s) involved in the accident.

"Event data" can refer to information relating to an operation of a vehicle, an environment around the vehicle, and any other information that may be useful for reconstructing an accident.

The event data stored in the event data recorder of a vehicle can include data in a time interval before and after the accident. However, techniques or mechanisms generally do not exist to allow for an easy way to obtain recorded data from other automated entities, such as another vehicle that was not involved in the accident and/or a roadside unit (RSU).

An RSU can refer to any device that includes a radio (or other wireless interface) placed at a roadside infrastructure (e.g., traffic sign, street light, traffic light, etc.) that receives and transmits messages to vehicles. In the United States of America, the specification for RSUs can include the Dedicated Short Range Communication (DSRC) Roadside Unit (RSU) Specifications Document version 4.1 (or another version). In other examples, RSUs can operate according to other standards or using proprietary specifications.

Further challenges relating to collecting information relating to an accident can be caused by the following.

Event data recorders in vehicles or RSUs are not currently standardized, which can make it difficult to collate, compare, sequence, and corroborate data recorded by event data recorders that store data according to different formats.

In addition, to obtain data of event data recorders, specially trained professionals may have to be retained who can physically access the vehicles and copy the data from the event data recorders of the vehicles to specialized crash data recorder equipment.

Furthermore, some event data recorders have a relatively small amount of data storage to store event data. At some point, the event data stored in an event data recorder may be overwritten by new event data. As a result, event data that may be relevant to an accident may be lost if not retrieved in a timely fashion.

Also, an efficient mechanism does not exist to locally or remotely identify parties involved in an accident and witnesses of the accident, to allow for retrieval of the relevant event data in an efficient manner.

Accident reconstruction refers to a process of investigating an accident scene soon after (within some period of time of) the accident to determine what led to the crash. Serious accidents can cause road closures for extended time periods while investigators perform their work.

In accordance with some implementations of the present disclosure, automated systems or techniques are provided to allow for detection of an accident involving a first vehicle, and responsive to the detecting of the accident, collect event data relating to the accident from a second vehicle that is different from the first vehicle. An accident involving "a first vehicle" can refer to an accident involving just the first vehicle, or the multiple vehicles including the first vehicle. The second vehicle from which the event data is collected can include an observing vehicle that was not involved in the accident. Event data can be collected from multiple vehicles, including the first vehicle, the second vehicle, and possibly other vehicles. Event data can also be collected from other entities, such as an RSU (or multiple RSUs).

FIG. 1 is a block diagram of an example arrangement that includes vehicles 102A that were involved in an accident. A vehicle "involved in an accident" can refer to a vehicle that has collided with another vehicle or another object (e.g., a person or non-vehicular infrastructure such as a street sign, a street light, a barrier, etc.), or a vehicle that has deviated from a roadway or has otherwise deviated from a normal traveling orientation and that has resulted in damage (e.g., the vehicle falling into a ditch, the vehicle flipping over to its side or on its roof, etc.). Additional accidents include non-vehicular objects including environmental items (e.g. loose animals, snow or mud slides) or other objects and may include damage to stationary vehicles.

Although FIG. 1 shows an example where two vehicles were involved in the accident, in a different example, just a single vehicle may be involved in an accident, or more than two vehicles may be involved in an accident.

FIG. 1 further depicts observing vehicles 102S, which are vehicles that were in the vicinity of a location of the accident but were not involved in the accident. A vehicle being in a "vicinity" of a location of an accident refers to the vehicle being close enough such that event data acquired by the vehicle, such as in an event data recorder of the vehicle, may be relevant to the accident. In other examples, a vehicle being in a "vicinity" of a location of an accident can refer to the vehicle being within a specified threshold distance of the location of the accident.

Although FIG. 1 shows an example that includes two observing vehicles 102S, in other examples, there can just be a single observing vehicle or more than two observing vehicles.

FIG. 1 also shows an RSU 104 that may be in the vicinity of the location of the accident. Although just a single RSU is shown in FIG. 1, in other examples, there can be more than one RSU in the vicinity of the location of the accident.

Each of the vehicles 102A, 102S, and the RSU 104 are coupled to a network 106, which can be a wireless network in some examples. For example, the wireless network can include a cellular network or another type of wireless network. Some parts of the network can also be wired, for example the RSU 104 connection to the network 106 or the connection of a damaged vehicle 102A to the network 106 when the damaged vehicle's wireless communication system is no longer operational.

An example cellular network can operate according to the Long-Term Evolution (LTE) standards as provided by the Third Generation Partnership Project (3GPP). The LTE standards are also referred to as a fourth generation (4G) cellular network or the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) networks, e.g., 5G New Radio (5G-NR or NR) or 5G System (5GS) deployed either as standalone (SA) network deployments or non-standalone (NSA) network deployments. In non-standalone case 5G-NR may deployed with an associated cellular network, e.g., 4G LTE network in a dual connectivity configuration. In other examples, cellular networks can refer to other generation cellular networks beyond 5G, and with varying co-dependent or collocated configurations of associated cellular networks.

Other types of wireless networks can include a wireless local area network (WLAN) that operates according to the Institute of Electrical and Electronics Engineers (IEEE) 802.11 standards, IEEE 802.11a standards, IEEE 802.11p standards (e.g., Dedicated Short Range Communication (DSRC)), IEEE 802.11bd standards (e.g. Enhancements for Next Generation V2X), an Integrated Digital Enhanced Network (iDEN), and so forth.

In the example of FIG. 1, each of the vehicles 102A, 102S, and the RSU 104 are capable of performing vehicle-to-everything (V2X) communications.

V2X is a feature that provides for communication of information from a vehicle to other entities (and possibly also/alternatively vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., RSUs (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

V2X communications can also include transmissions from an RSU to other entities, including vehicles or other entities.

More generally, V2X communications can include any communication of vehicle-related information from a source device to one or more recipient devices. A "vehicle-related information" can refer to information that includes data pertaining to a vehicle or an infrastructure that supports vehicles (e.g., RSUs, traffic lights, traffic signs, etc.); control information that affects operations of a vehicle or an infrastructure that supports vehicles; navigation data; vehicle sensor data, RSU sensor data, and any other information that is directly or indirectly associated with vehicles.

To support V2X communications, the vehicles 102A include respective V2X stacks 108A, and the vehicles 102S include respective V2X stacks 108S. The RSU 104 includes a V2X stack 110. A "V2X stack" refers to a layer or a number of layers or interfaces that define the protocol(s) used for performing V2X communications. Examples of V2X communication standards and protocols can include any or some combination of the following.

IEEE 1609 includes a set of standards for V2X communications based on the Wireless Access in Vehicular Environments (WAVE) protocol stack in the 5.9 gigahertz (GHz) band. A system that operates according to WAVE Short Message Protocol (WSMP) that defines formats of messages used to carry V2X communications.

J2945/1 refers to a standard for V2V safety communications. This standard specifies the requirements for transmitting collision avoidance information over IEEE 1609. J2945/1 specifies the use of Basic Safety Messages (BSMs). A BSM can include a broadcast message containing information about a vehicle and its movement (e.g., geographic location of the vehicle, a heading of the vehicle, a speed of the vehicle, an acceleration/deceleration of the vehicle, etc.). A BSM can be transmitted by a vehicle on a periodic basis, such as every 100 milliseconds (ms) or some other periodic interval.

A Connected Vehicle Reference Implementation Architecture (CVRIA) defined by the U.S. Department of Transportation (USDOT) that identifies interfaces for connected vehicle environments.

In other examples, the V2X stacks 108A, 108S, and 110 can operate according to other standards (e.g., an industry standard, a public standard such as that defined by a government, or a proprietary standard such as that defined by a manufacturer of a vehicle or RSU).

The vehicles 102A include respective event data recorders (EDRs) 112A, and the vehicles 102S include respective event data recorders 112S. The RSU 104 includes an EDR 114. Each EDR is to record event data relating to an operation of the respective vehicle or RSU.

The data size of sensor data and received V2X communication are both such that raw data, if stored, cannot be stored for long. In accordance with some implementations of the present disclosure, detection of an accident can trigger storing of event data from the EDR to another storage medium, referred to as an accident investigation data recorder (AIDR). FIG. 1 shows an accident investigation data recorder (AIDR) 113A in each vehicle 102A, an AIDR 113S in each vehicle 102S, and an AIDR 115 in the RSU 104. An AIDR can be implemented using a nonvolatile memory, for example. The AIDR may be larger than the respective EDR, such that the AIDR can store more event data without being overwritten, to give an accident reconstruction process enough time to collect data for reconstructing the accident. An alternative or extended implementation of the AIDR may include where possible the EDR or AIDR transmitting the data to a network connected storage medium such as a cloud store.

In some examples, the vehicles 102A include sensors 116A, and the vehicles 102S include sensors 116S. Examples of sensors in the vehicles can include any or some combination of the following: accelerometers, gyroscopes, positioning sensors (e.g., Global Positioning System (GPS) receivers, etc.), a camera, a microphone, a temperature sensor, and so forth. The sensors can measure conditions and environments in various parts of a vehicle, such as the vehicle engine, the passenger compartment, the vehicle trunk, the environment surrounding the vehicle, and so forth. As further examples, speed sensors and accelerometers can record the velocity and acceleration of a vehicle. A camera can record the environment outside of a given vehicle, where the image (a still image or video) collected by the camera can include other vehicle(s), person(s) outside the given vehicle, and objects (e.g., traffic light, traffic sign, trees, barriers, etc.) around the given vehicle.

The EDRs 112A and 112S can record sensor data collected by the sensors 116A and 116S, respectively. The EDRs 112A and 112S can also record data of controllers (e.g., electronic control units or ECUs) of the vehicles 102A and 102S, respectively.

The RSU 104 can also include sensors 118, which can include any combination of the following: a camera, a microphone, a temperature sensor, etc. The EDR 114 of the RSU 104 can record sensor data from the sensors 118 (e.g., an image of an environment around the RSU 104, sound of the environment around the RSU 104, etc.). The EDR 114 of the RSU 104 can also record other information relating to an operation of the RSU 104 (e.g., whether a traffic light was red, yellow, or green, what message a traffic sign was displaying, etc.).

FIG. 1 also shows a server system 119 that includes an accident information service (AIS) 120 that is used to collect information relating to an accident in response to detection of the accident. The AIS 120 can include machine-readable instructions executed by the server system 119. The server system 119 can include a computer or a collection of computers. The AIS 120 can perform detections of accidents, and the AIS 120 can take action in response to such accident detections. The detection of an accident by the AIS 120 can be based on a report from an RSU or a vehicle. For example, an RSU may determine, based on event data, that an accident has occurred, and can send a report or other accident indication indicating that the accident has occurred. Alternatively, the detection of the accident can be by a vehicle involved in the accident, or by an observing vehicle. As another example, the AIS 120 can detect an accident based on processing of event data by the AIS 120, where the event data processed by the AIS 120 can be received from vehicle(s) and/or RSU(s).

In response to detecting an accident, the AIS 120 can validate that the accident has occurred, can query other entities in the vicinity of the accident, and can process accident information received from entities in the vicinity of the accident.

The server system 119 is connected to the network 106 to allow the AIS 120 to communicate with any of the vehicles 102A, 102S, and the RSU 104. In some examples, an AIS may not be able to communicate with a particular vehicle, in which case the AIS can communicate with a particular vehicle through the RSU 104, which in such examples can act as a proxy between the AIS 120 and the particular vehicle.

To allow a vehicle or an RSU to communicate with the AIS 120, the vehicle or RSU includes an accident information agent (AIA) 124. In examples according to FIG. 1, the vehicles 102A include AIAs 122A, and the vehicles 102S include AIAs 122S. An "accident information agent" or "AIA" can include machine-readable instructions that are executed by a respective vehicle or RSU to interact with the AIS 120, where the interaction include communications of information and other types of interactions.

If a vehicle or an RSU does not include an AIA, then the vehicle or RSU would not be able to communicate with the AIS 120. In such cases, the vehicle or RSU can employ another vehicle or another RSU as a proxy to communicate with the AIS 120.

Figure 2:
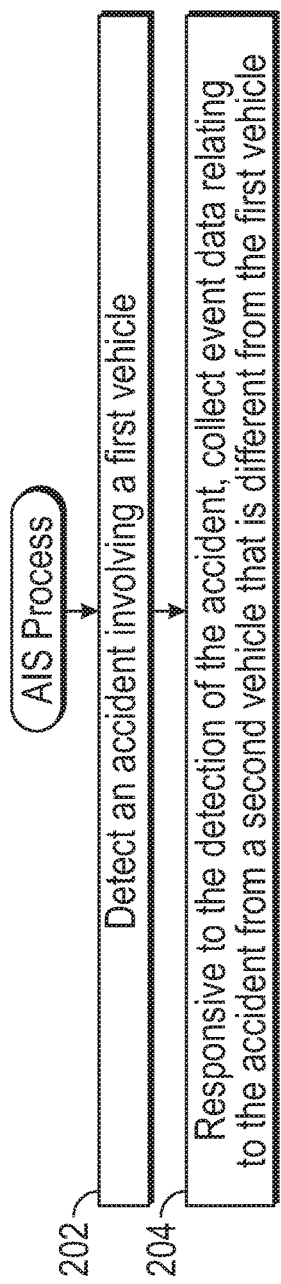
FIG. 2 is a flow diagram of an AIS process, according to some implementations of the present disclosure.

FIG. 2 is a flow diagram of a process that can be performed by the AIS 120 according to some examples. The AIS 120 detects (at 202) an accident involving a first vehicle. Responsive to the detection of the accident, the AIS 120 collects (at 204) event data relating to the accident from a second vehicle that is different from the first vehicle.

In the context of claim 1, the first vehicle can include a vehicle 102A, while the second vehicle can include an observing vehicle 102S.

In some examples, the detection of the accident by the AIS 120 can be based on a report from a source selected from any one or combination of vehicles and RSUs. The event data can further be collected from other vehicles (whether or not involved in the accident) and from RSUs. In some instances, the access to the event data may be restricted and only accessible following authorization from an identified secure authority or by the owner of the event data, e.g., the vehicle owner or driver.

Event Data

In some examples, an EDR (112A, 112S, or 114) can record event data in a BSM (or multiple BSMs). As noted above, a BSM includes information about a vehicle and its movement (e.g., geographic location of the vehicle, a heading of the vehicle, a speed of the vehicle, an acceleration/deceleration of the vehicle, etc.). BSMs can be sent and/or received by vehicles and RSUs.

An EDR can store information contained in BSMs sent and received by a vehicle or RSU over a specified time period; in some instances the data (e.g., BSMs) may be stored with an associated timestamp. If an accident occurs, the data stored in the EDR can be obtained (such as by the AIS 120 of FIG. 1) to be analyzed to determine events leading up to the accident. Note that a trigger event may have caused event data in the EDR to be saved to a corresponding AIDR (any of 113A, 113S, or 115 in FIG. 1), and the event data can be obtained from the AIDR.

The data of BSMs sent by a vehicle in a time interval before the accident can provide information relating to the state of the vehicle right before the accident. The data of BSMs received by the vehicle in the time interval before the accident can provide information relating to states of other vehicles proximate the vehicle. Using data of BSMs received from multiple vehicles with their respective timestamps, a dynamic map of the states of the multiple vehicles can be created, including positions, headings, speeds, accelerations, etc., of the multiple vehicles right before the accident. For example, a path history for each vehicle in the vicinity of the accident on a roadway can be determined from the BSM data, and can be used to understand the conditions leading up to the accident.

In addition, an EDR can store other information, such as radar and sensor readings, light detection and ranging (LIDAR) data, camera images, data of an infotainment system, and so forth. Such other information can track or indicate states of other onboard systems such as vehicle system control sensors, e.g., traction control, that may assist in reconstructing an accident. An EDR can also store V2X messages, such as V2X messages received from other vehicles or from infrastructure (e.g., RSUs).

Probe data (e.g., camera images, license plate readers, etc.) can be collected from an RSU to identify (possibly anonymously) other vehicles in the vicinity of the location of the accident. This can allow the RSU or the AIS 120 to request information from the identified vehicles that were in the vicinity of the accident location at the time of the accident. Comparison of information between the vehicles involved and other vehicles in the vicinity of the accident may show lost or delayed messages which may contribute to understanding what happened.

In further examples, the event data can include further data from other sources, such as dynamic map data (MAP), Signal Phase and Time (SPaT) data, or Traveler Information Message (TIM) data. The dynamic map data can include map information of a roadway, such as at an intersection or other part of a roadway. The SPaT data includes roadway infrastructure data such as whether a traffic light was green, yellow, or red, for example. The TIM data can include traffic information of traffic on a roadway.

In some examples, reconstruction of an accident can include running collected event data on programmable simulators, which can simulate, based on the event data, positions and headings of vehicles involved in the accident.

Trigger Collection of Event Data after an Accident

In the event of an accident, an alert message can be used to trigger the storage of event data from vehicles and infrastructure (e.g., RSUs) in the vicinity of the accident. The alert message can act as a trigger for vehicles and infrastructure (in range of the transmitted alert message) to store recently recorded EDR information leading up to the accident. Storage may be locally within the EDR or may include storage to other storage system or device such an accident investigation data recorder (AIDR). Alternatively, or in addition to storing on the AIDR, the event data may be transmitted to a network connected storage medium, e.g., cloud storage.

In some examples, the alert message can be transmitted by the AIS 120, such as the AIS 120 detecting an accident. In other examples, the alert message can be transmitted by an RSU or by another entity.

In some examples, the alert message can include a V2X message. For example, the alert message may be encapsulated in an WSMP frame and transmitted to vehicles and RSUs through V2X communications systems. Alternatively, the alert message can be transmitted (such as by a national alert system) over other communication media such as by use of commercial radio (e.g., AM radio, FM radio, Satellite Digital Audio Radio Service (SDARS), Digital Audio Broadcasting (DAB), etc.), cellular communications, Wi-Fi communications, Bluetooth communications, ultrasonic communications, and so forth.

Accident Handling Procedures

Figure 3:
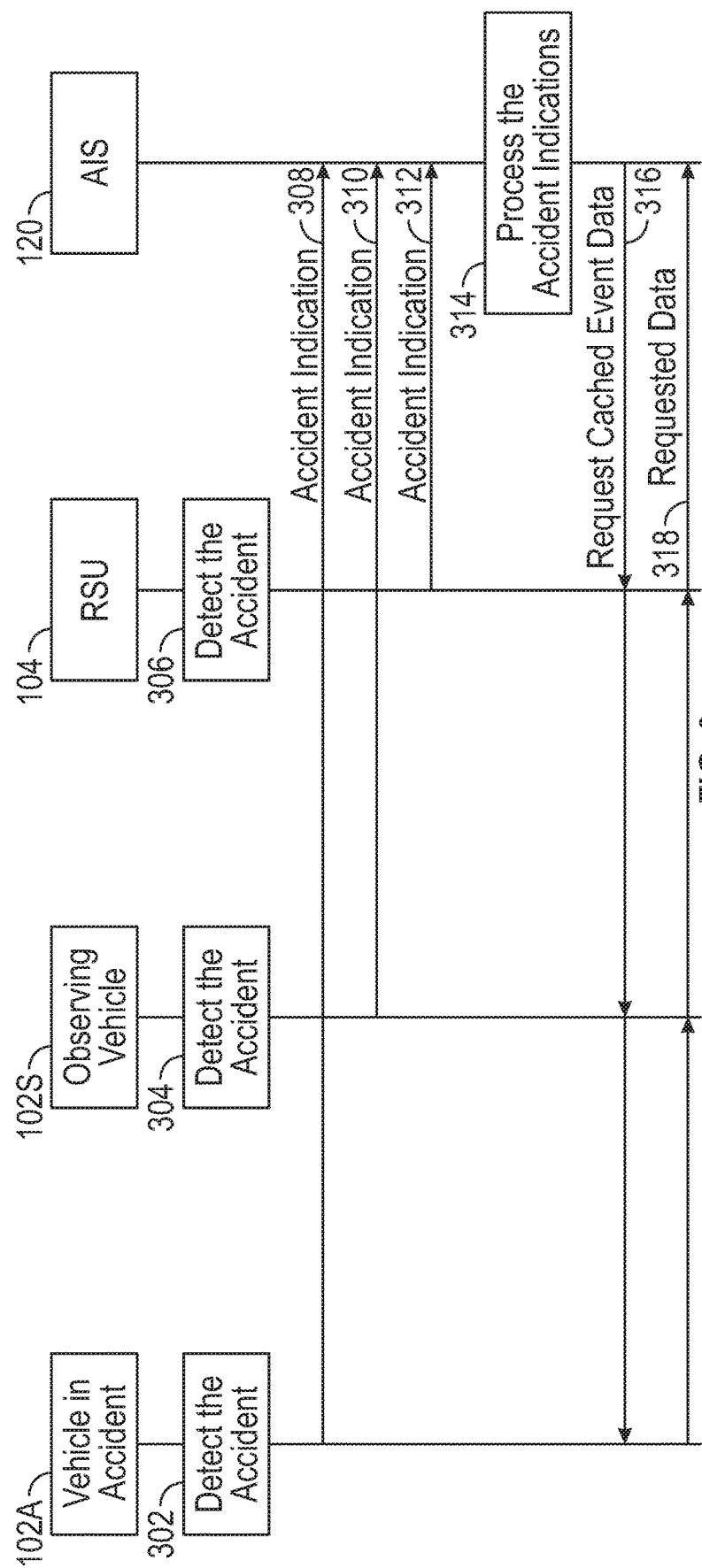
FIGS. 3-5 are message flow diagrams of processes according to some implementations of the present disclosure.

FIG. 3 is a message flow diagram of an example procedure including tasks of various entities for handling an accident. In FIG. 3, a vehicle 102A is involved in the accident.

The vehicle 102A (which was involved in the accident) can detect (at 302) the accident, and/or an observing vehicle 102S (which was not involved in the accident but was within a vicinity of the location of the accident) can detect (at 304) the accident. The detection of the accident by the vehicle 102A or 102S can be based on event data recorded in the vehicle's EDR.

Alternatively or additionally, the RSU 104 (or other roadside infrastructure) can detect (at 306) the accident. The detection is based on some trigger event, either within the RSU 104, or signaled to the RSU from an external source. For example, the RSU 104 can process its sensor data to determine whether an accident has occurred, and if so, the RSU 104 issues a trigger event. Alternatively, an external source detects the accident, and sends an accident indication to the RSU 104. For example, the RSU 104 may receive multiple accident indications from multiple vehicles, such as the vehicle 102A and/or the vehicle 102S.

An "accident indication" can include a report, a message, an information element, a signal, or can be in any other form.

Each accident indication may be generated by a vehicle or RSU from information cached in the event data recorder of the vehicle or RSU right before, during, and right after the accident has been signaled or detected.

In response to the detection of an accident, a vehicle (either or both of a vehicle involved in an accident or an observing vehicle in the vicinity of the location of the accident) or an RSU (in the vicinity of the location of the accident) can store recent BSMs, MAP, SPaT data, and/or TIM data (in addition to data they may have already been storing).

An observing vehicle can either detect the accident based on the observing vehicle's event data, or alternatively, the observing vehicle may receive an accident indication from another vehicle (whether or not involved in the accident) or from an RSU. The observing vehicle storing various types of data, such as BSM data, MAP data, SPaT data, TIM data, and so forth can be responsive to the observing vehicle's own detection of the accident, or responsive to an accident indication from another vehicle or the RSU.

In some examples, in response to detecting an accident, a vehicle or an RSU can transition to a high resolution recording mode in which the vehicle or RSU records various types of data, including BSM data, MAP data, SPaT data, TIM data, and other data at a higher resolution (e.g., at smaller time intervals or at finer spatial resolutions).

Each or any of the vehicle 102A, the vehicle 102S, and the RSU 104 that has detected the accident can send (at 308, 310, or 312) an accident indication to the AIS 120.

In some cases, a vehicle that is not able to communicate with the AIS 120 can send its accident indication through an RSU or another vehicle acting as a proxy.

The AIS 120 may process (at 314) accident indications from multiple sources (vehicles and RSUs) to verify that an accident has in fact occurred.

In response to the AIS 120 verifying the accident did occur, the AIS 120 can request (at 316) the reporting RSU and the reporting vehicles and any other vehicles identified (such as by the RSU or another vehicle) in the accident for any cached event data, including BSM data, MAP data, SPaT data, and so forth. In response to the request, each vehicle or RSU may respond by sending (at 318) the requested data to the AIS 120.

In some examples, the observing vehicle 102S that was not involved in the accident but that was in the vicinity of the location of the accident may detect a sudden change in the local dynamic map, or may receive a collision alert message, or may detect via other trigger(s), e.g., on-board sensors which trigger an incident alert event. On detection of the event trigger, the observing vehicle 102S stores the event log in the AIDR. The observing vehicle 102S may trigger or transmit the event log or some identifier or marker to the AIS 120, including the stored data in the AIDR relating to the event. Subsequently, a driver or passenger of the observing vehicle 102S may confirm via a user interface (UI) or associated system the retention of the event data, the transmission of the event data, or the deletion of the event data. Privacy aspects regarding access to the data may be taken into account (e.g., ask permission of the driver or witness, as they may have to acknowledge that their location at that time will be made known to others, such as police or government authorities, insurance agents, etc.). The event data may be transmitted to investigating personnel as well as other private and or secure local or cloud storage systems or facilities.

In some cases, the reporting and alerting of accident events may be restricted to vehicles that are involved in the accident, any authorized vehicles (e.g., a police car, emergency service responder or tow truck), and RSUs.

In some examples, a request to obtain accident information (e.g., by an investigation service or the police) and the information included in the response may have the following characteristics.

The request and response are authenticated and authorized.

A response, sent from a vehicle to another entity, such as the roadside infrastructure, should protect the privacy of the driver or other user of the vehicle, such as based on use of IEEE 1609.2 security, which provides security and privacy.

The storage of event data in the vehicle should be tamper-proof and integrity protected.

In some examples, an authorization for collecting data from observing vehicles not involved in the accident can be provided according to any of the foregoing. An operator of the observing vehicle may provide the authorization as a condition of holding a driver's license. The operator of the observing vehicle may provide the authorization as part of an opt-in program similar to those used for insurance tracking for driving, in which the driver benefits from lower insurance rates if the driver participates. An opt-out program may be provided, where participation is provided unless the operator of the observing vehicle explicitly opts out.

Further Details Regarding Various Entities Involved in Accident Handling

Various entities noted above that can be involved in accident handling according to some implementations of the present disclosure may have any or some combination of the following further characteristics, in some examples.

An RSU is capable of receiving BSMs and maintaining a local dynamic map of the roadways within wireless range (i.e., vehicles on the roadways are within wireless range of the RSU). The RSU is capable of receiving other V2X messages (other than BSMs) from vehicles and other connected transport entities. The RSU is capable of transmitting messages to vehicles within wireless range, such as MAP messages, SPaT messages, TIM messages, and so forth. The RSU is capable of communicating, such as over a backhaul network (a cellular network, a Wi-Fi network, a fixed line, etc.) either immediately or at a later time, with an AIS.

A vehicle involved in an accident is capable of detecting that the vehicle crashed (e.g., based on airbag deployment, accelerometer data, microphone data, image data from a camera, or other sensor data). The vehicle involved in an accident is capable of sending BSMs as well as other V2X messages to vehicles and RSUs. The vehicle involved in an accident is capable of receiving BSMs and maintaining a local dynamic map of the roadways within wireless range. The vehicle involved in an accident is capable of communicating, over a backhaul network either immediately or at a later time, with the AIS (assuming the transmitter of the vehicle was not damaged in the accident). If the transmitter of the vehicle was damaged in the accident, a wired connection may be used (e.g., a Universal Serial Bus (USB), Ethernet or another vehicular bus technology).

An observing vehicle not involved in an accident is capable of receiving BSMs and maintaining a local dynamic map of the roadways within wireless range. In some examples, information received from other vehicles by the observing vehicle may be subject to privacy restrictions. For example, user identities in received BSMs may include temporary identifiers, such as temporary pseudo-anonymous identifiers. For example, a temporary pseudo-anonymous identifier can include a DE_TemporaryID at the application layer, according to the J2945/1 standard. In other examples, other temporary identifiers of vehicles or users can be employed.

When corroborating data from different observing vehicles, the temporary identifiers can be used to provide a general indication of which vehicle the data was received from. The observing vehicle is capable of detecting a local crash (such as based on a received V2X message, accelerometer data, microphone data, image data from a camera, or other sensor data). The observing vehicle is capable of communicating, over a backhaul network either immediately or at a later time, with an AIS.

An AIS can have an identity and credentials to provide authorization and identification to vehicles. The AIS can include a service associated with an emergency infrastructure (e.g., associated with a public safety answering point (PSAP)). The AIS can be a public government run service like the PSAP, or the AIS could be a private service run, e.g., by insurance companies or traffic service delivery companies either individually or as a consortium. The AIS can also be a specialized service, e.g., run by large fleet operators such as rented/leased car service operators or taxi/mobility service operators or vehicle manufacturers (OEMs).

A Vulnerable Road User (VRU) that participates in V2X communications can be treated as a vehicle involved in observing an occurrence of the accident. Alternatively, the VRU (and the VRU's mobile device or other personal device) may be involved in an accident. The VRU (or more specifically a mobile device of the VRU) is capable of transmitting BSMs from the VRU's mobile device, such as BSMs relating to collision avoidance. The VRU is capable of recording data (e.g., photos, videos, sound recordings, automated voice commands, etc.) of the scene just before and immediately after detection of an accident. The recorded data may include associated timestamps. The VRU is capable of communicating, over a backhaul network either immediately or at a later time, with an AIS.

In some cases, data (including messages sent or received, triggers detected, etc.) stored by an EDR of a first vehicle or RSU may have a different time sequence than data stored by an EDR of another vehicle or RSU. In some examples, an AIS may correlate timepoints of the data from the different EDRs, as part of the accident investigation.

Further Example Accident Handling Procedures

Figure 4:
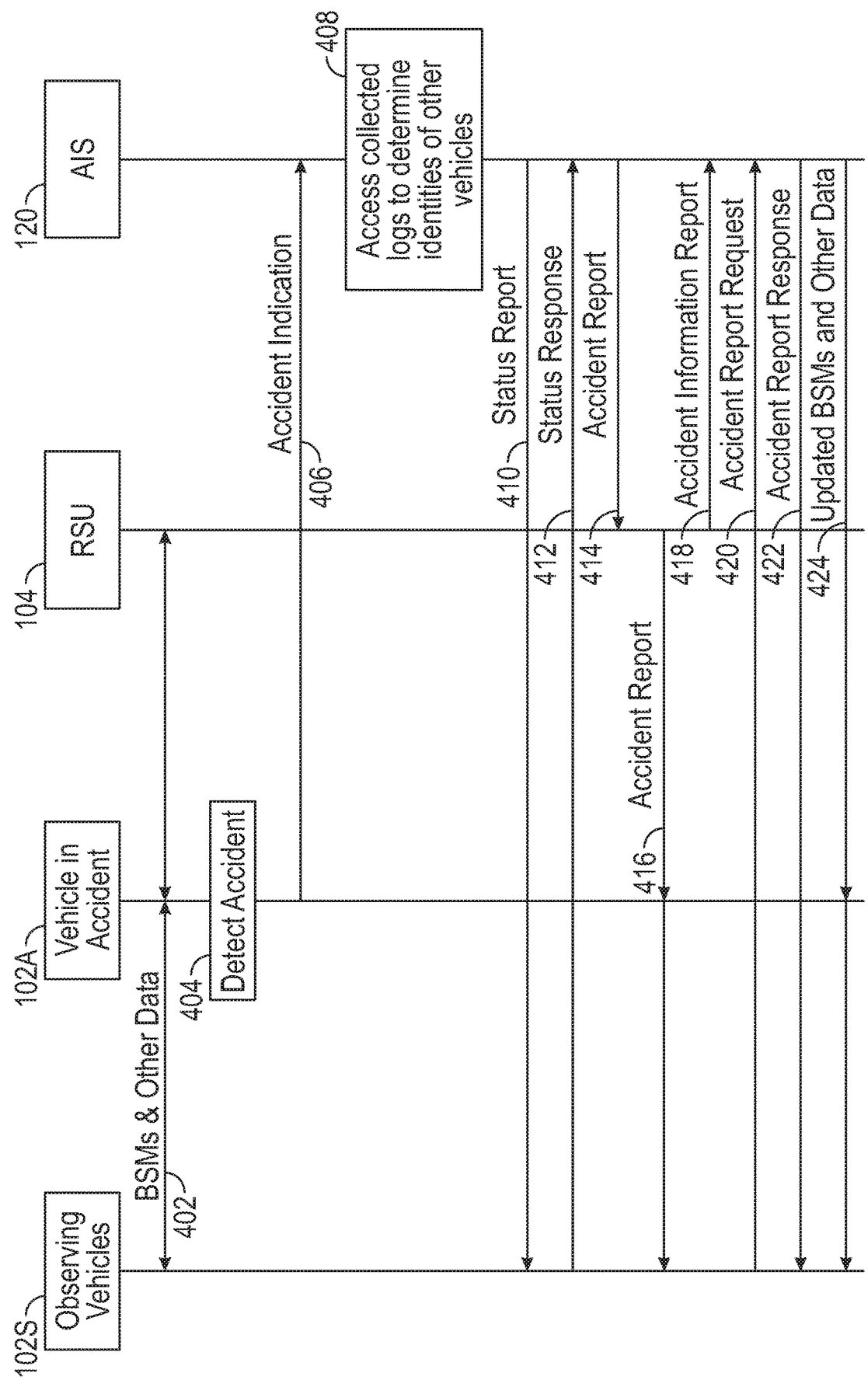

FIG. 4 further illustrates a message flow of a process for accident handling. BSMs and other messages (e.g., MAP, SPaT, TIM, etc.) are transmitted (at 402) between RSUs and vehicles 102S and 102A on a regular basis (e.g., periodically or responsive to certain events). In the example of FIG. 4, it is assumed that the vehicle 102A was involved in an accident, and the observing vehicles 102S are within a vicinity of the location of the accident.

An accident can be detected (at 404) by the vehicle 102A in the accident (hereinafter referred to as the "accident vehicle" 102A). For example, acceleration data from an accelerometer of the accident vehicle 102A may indicate a sudden drop in acceleration, in combination with one or more other measurements that indicate an accident may have occurred: 1) a spike in the acceleration caused by impact of the accident vehicle 102A with another object; 2) a sudden change in orientation, such as detected by a gyroscope or other type of rotation sensor; and so forth.

Although the example of FIG. 4 assumes detection of the accident by the accident vehicle 102A, any or some combination of the observing vehicles 102S and the RSU 104 can also detect the accident of the accident vehicle 102A based on sensor measurements of the observing vehicles 102S and the RSU 104, including for example based on image analysis of image data collected by cameras on the observing vehicles 102S and those connected to the RSU 104, analysis of sound data collected by microphones on the observing vehicles 102S and those connected to the RSU 104, and so forth.

The accident vehicle 102A sends (at 406) an accident indication to the AIS 120. The accident indication contains an identity of the accident vehicle 102A together with some protected (e.g., authenticated and encrypted) information about the accident (e.g., event data from the EDR of the accident vehicle 102A collected before, during, and after the accident). The "identity" of a vehicle can include a serial number of the vehicle, a license plate of the vehicle, a name of the owner of the vehicle, or any other identifier that can uniquely identify the vehicle. The encryption of the information is to avoid public dissemination of raw accident information. In other examples, the information is not encrypted.

The accident indication sent by the accident vehicle 102A can also include credentials (e.g., a username, a password, a security certificate, etc.) that the AIS 120 can use to authenticate the accident vehicle 102A, to confirm that the accident indication is not sent by another entity (e.g., a hacker or malware).

In other examples, if an observing vehicle 102S or the RSU 104 sent the accident indication, then the accident indication contains an identity of the observing vehicle 102S or the RSU 104.

In response to the accident indication, the AIS 120 accesses (at 408) collected logs (containing information of vehicles and RSUs received in the past), to determine the identities of other vehicles involved in the accident or observing vehicles in the vicinity of the accident. The information of the logs processed by the AIS 120 is associated with a time interval right before and during the accident. The AIS 120 may interact with a Security Credential Management System (SCMS) or a Certification Candidate Management System (CCMS) (for V2X communications) to determine such identities of the other vehicles, as existing BSMs are designed to hide identities of vehicles and drivers. Alternatively, new BSMs may be used which do not hide the identity of either the vehicle or the driver, when laws or rules specify that privacy is to be overridden for accident and investigation purposes. An "existing" BSM refers to a BSM that conforms with current standards, while a "new" BSM refers to a BSM that does not conform with current standards, but that may or may not conform with future standards.

Once the identities of the other vehicles (e.g., the observing vehicles 102S in FIG. 4) are determined by the AIS 120, the AIS 120 sends a query to the observing vehicles for information relating to the accident. Such a query can be in the form of a status report (sent at 410) requesting a report for each observing vehicle 102S. The status report can request event data of each observing vehicle 102S in the recent past, such as within some specified time interval. Alternatively, the status report can request event data relating to the accident.

The status report from the AIS 120 can include credentials of the AIS 120, so that each observing vehicle 102S that received the status report can authenticate the AIS 120. The status report from the AIS 120 can also include an identity of the accident vehicle 102A.

In some examples, the AIS 120 is able to determine whether the AIS 120 is authorized to query an observing vehicle in the vicinity of the accident that was not involved in the accident. This determination can be based on an indication stored in the AIS 120 or sent to the AIS 120. For example, the indication can indicate whether an observing vehicle has the ability to send event data relating to an accident.

The observing vehicles 102S can respond to the query with the requested information relating to the accident, such as by sending (at 412) respective status responses. Information in the status responses may be encrypted in some examples. Each accident response contains an identity of the transmitting observing vehicle 102S, the information relating to the accident, and credentials of the transmitting observing vehicle 102S (to allow the AIS 120 to authenticate the transmitting observing vehicle 102S).

The AIS 120 can send (at 414) an accident report to the RSU 104. In some examples, the accident report can include the identity of the accident vehicle 102A.

The RSU 104 can relay (at 416) the accident report to the vehicles in the vicinity of the accident (and within wireless range of the RSU 104).

In response to the accident report from the AIS 120, the RSU 104 may also send (at 418) a report containing information relating to the accident to the AIS 120. The report sent by the RSU 104 to the AIS 120 may further contain an identity of the accident vehicle 102A.

The observing vehicles 102S may send (at 420) accident report requests to the AIS 120. Each accident report request contains an identity of the transmitting observing vehicle 102S. If the AIS 120 receives an accident report request from an observing vehicle 102S, the AIS 120 may respond (at 422) with an accident report response containing the information the AIS 120 has received so far (such as from other observing vehicles 102S, the accident vehicle 102A, and the RSU 104), assuming that local privacy laws are taken into account. The accident report response also contains the identity of the accident vehicle 102A.

If the AIS 120 desires additional supplemental information (e.g., information from a camera), the AIS 120 can query vehicle(s) or infrastructure to provide supplemental information from an authorized supplemental information provider (e.g., an RSU or trusted support vehicle) in the vicinity of the accident.

The AIS 120 can send (at 424) updated BSMs and other data to the observing vehicles 102S and the vehicle 102A.

Figure 5:
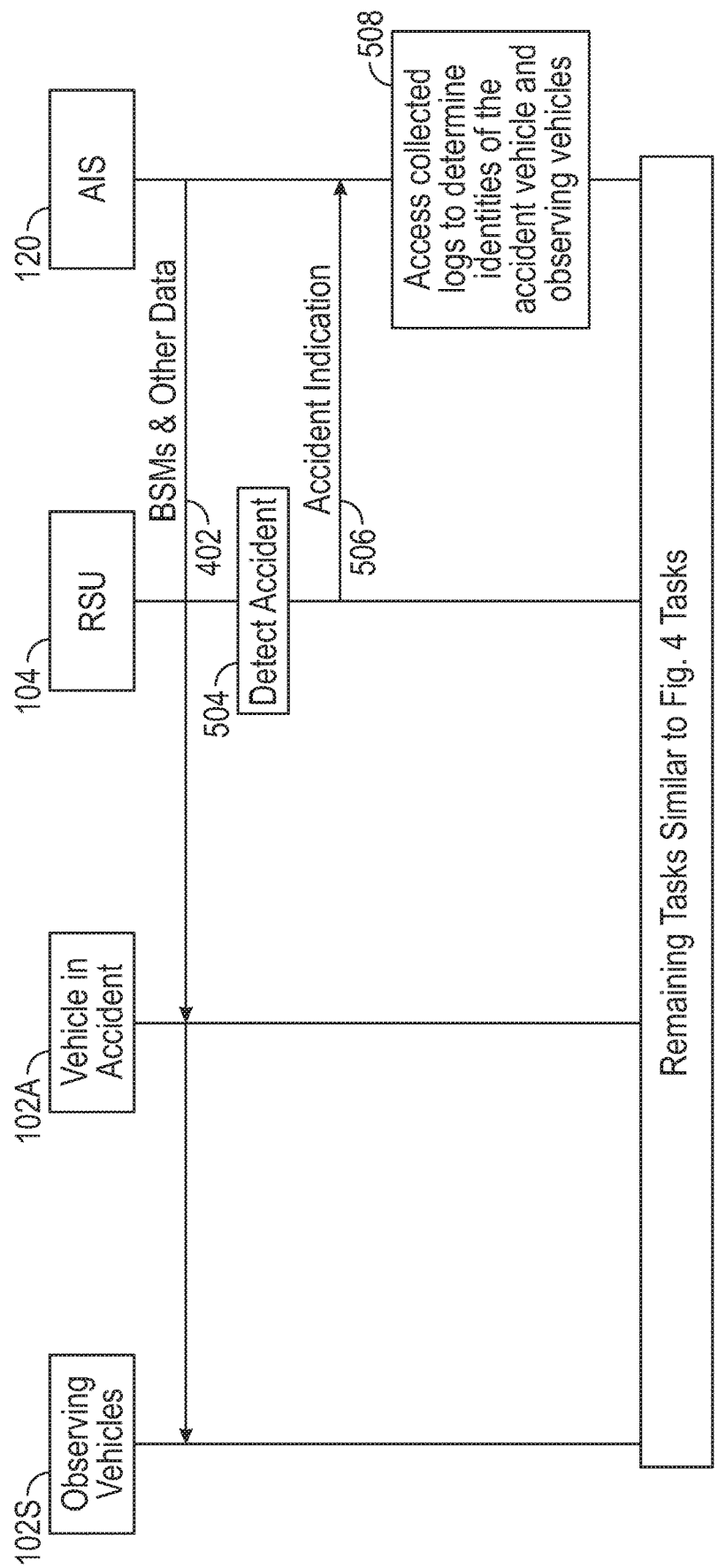

FIG. 5 illustrates a message flow of a process for accident handling, according to another example. Messages and tasks in FIG. 5 that are similar to those in FIG. 4 are assigned the same numerals as in FIG. 4.

In FIG. 5, the RSU 104 detects (at 504) the accident. In response to detecting the accident, the RSU 104 sends (at 506) an accident indication to the AIS 120. The accident indication contains protected (e.g., authenticated and encrypted) information about the accident (e.g., event data from the EDR of the RSU 104 collected before, during, and after the accident). In other examples, the information is not encrypted. The accident indication sent by the RSU 104 can also include credentials of the RSU 104 that the AIS 120 can use to authenticate the RSU 104, to confirm that the accident indication is not sent by another entity (e.g., a hacker or malware).

In response to the accident indication, the AIS 120 accesses (at 508) collected logs (containing information of vehicles and RSUs received in the past), to determine the identities of accident vehicles 102A and the observing vehicles 102S in the vicinity of the accident.

The remaining tasks of FIG. 5 are similar to corresponding remaining tasks (following task 408) of FIG. 4.

In other examples, other example accident handling processes can be used.

It is noted that the depicted messages flows are optional and do not have to follow the depicted sequences. Information fields may be optional and may vary depending on the circumstances of the accident, together with the country, legal, and data privacy requirements. Vehicles can store received and transmitted BSMs and MAP/SPaT/TIM messages in a log file for a period of time (e.g., 20 seconds or a different time period) that is windowed over time, from just before the accident and until just after, possibly with suitable timestamps. Vehicles may be capable of writing the log file to a persistent location when signaled of an accident. The log file may be stored securely. Mechanisms to make the log file tamper resistant include cryptographic operations such as encryption and/or signing.

Communications between with a vehicle and the AIS 120 that includes personally identifying information (PII) are secured. Information relating to an accident in V2X communication may include temporary pseudo-anonymous identifiers. The information relating to the accident can be transmitted in the clear as only parties to the accident can correlate the temporary pseudo-anonymous identifier to a real identity when reconstructing the accident. Should the vehicle communicate other sensor information such as video or photos that contain PII such as pictures of faces or license plates, this communication should be secured and only sent to a verified trusted AIS.

Roadside infrastructure or a vehicle can transmit and receive control information with the AIS 120. The AIS 120 can be embedded in a roadside infrastructure or can be a centralized service, for example collocated or operated by a PSAP.

The following are some example privacy considerations. As much as possible the data in the event recordings, observations, and reports used for reconstruction are de-identified (identities of vehicles or users are removed or obscured by using temporary pseudo-anonymous identifiers). When the AIS 120 takes these de-identified observations and aggregates them into a fuller picture of the scene, only the temporary pseudo-anonymous identifiers of parties involved in and near the accident are known. The act of correlating any temporary pseudo-anonymous identifier to a real identity of a vehicle or driver may be done via an opt-in action or on receipt of explicit authority, e.g., a court warrant, for a user or system to establish the real identity.

V2X temporary pseudo-anonymous identifiers can be used both in the recorded log, and for submitting the recorded log to the AIS. Only with the data from and permission from the accident vehicle can the temporary pseudo-anonymous identifier of the accident vehicle be mapped to a real identity of the accident vehicle. For example, there are 5 observing vehicles and two accident vehicles. A first accident vehicle was heading west, and the second accident vehicle was heading east when they collided. The AIS 120 takes recordings from 7 vehicles and one RSU and reconstructs the scene for 20 seconds before the accident. This can be done using the V2X temporary pseudo-anonymous identifier (in a BSM, for example). In some examples, a temporary pseudo-anonymous identifier can change every specified time interval (e.g., every 5 minutes or a different time interval), but will not be changed during the course of certain emergency scenarios. Because this temporary pseudo-anonymous is consistent across the 8 recordings, the reconstruction can happen. Once the reconstruction is complete, only the vehicle itself, or an investigator with on-the-scene observations can correlate the temporary pseudo-anonymous identifiers to the actual vehicle identities.

In some examples, a vehicle or RSU can include an AIDR (depicted in FIG. 1), in addition to the EDR. The AIDR can store a protected file when triggered. The protected file contains event data from the EDR and other information, for example, and can be encrypted or signed to protect the contents of the protected file from unauthorized access. The AIDR is able to transmit the protected file via secure connectivity to the AIS 120.

A vehicle can cache, such as in a circular buffer, any or some combination of the following: V2X messages for a period of time in the protected file in the AIDR; received BSMs; received MAP/SPaT/TIM data; received V2I messages; information of a state of the vehicle; sensor data indicating positions of other vehicles and objects around the vehicle; information of driver interaction with vehicle; and so forth.

A trigger event can trigger storing of any or some combination of the foregoing data in the AIDR, to more permanently store event data. The trigger event can include any or some combination of the following: indication that an accident occurred, such as deployment of an airbag, a sudden change in trajectory and velocity, a braking state, data from a vehicle integrity sensor (to detect the mechanical integrity of the structure of the vehicle), and so forth. This trigger event can be provided by any of an accident vehicle, an observing vehicle, or an RSU.

The trigger event can be based on a combination of events, which in some examples can be provided to a machine-learning algorithm to determine whether an accident occurred. The trigger event can also be based on processing of image data from a camera, sound data from a microphone, or other data from other sensors of a vehicle or RSU.

Once a vehicle or RSU detects an accident, the vehicle or RSU stores an event report (cached information from the EDR and other supplemental information). The accident event can be posted to an AIS. In some cases, properties of an accident event may trigger the AIS to signal a PSAP to request a first responder.

The AIS may trigger an RSU to signal (e.g., in a cellular network broadcast, a radio broadcast, an Intelligent Transportation System (ITS) broadcast, etc.) information to travelers or drivers to warn vehicles in the vicinity of the accident. The AIS may trigger connected ITS infrastructure (e.g. traffic lights, etc.) to manage existing and resulting vehicle traffic movement to ensure the safety of those involved in the accident and those responding to assist in the aftermath.

The AIS can query vehicles involved in the accident for accident event data. The AIS can analyze saved data to determine location of neighboring vehicles or RSUs. V2X temporary pseudo-anonymous identifiers can be used to probe nearby vehicles for data. Based on their V2X temporary pseudo-anonymous identifiers, neighboring vehicles are queried for event data reporting.

By using accident reconstruction techniques according to some examples, relevant data relating to the accident can be collected from multiple sources and analyzed to reconstruct the events leading to the accident in a smaller amount of time. This can allow accident scene investigators (e.g., police officers) to clear the accident more quickly in particular when the accident and/or evidence gathering is restricting passage along or through a roadway or traffic route.

The accident reconstruction and recorded event data can be used in the development of automated vehicles or advanced driver assist systems (ADAS). In particular the scenario can be used to train machine learning algorithms. The collisions can be used as input to deep learning systems to develop collision avoidance algorithms. This is in addition to the previously mentioned usage of the AIS to reconstruct the accident for insurance assessment or police enforcement.

Figure 6:
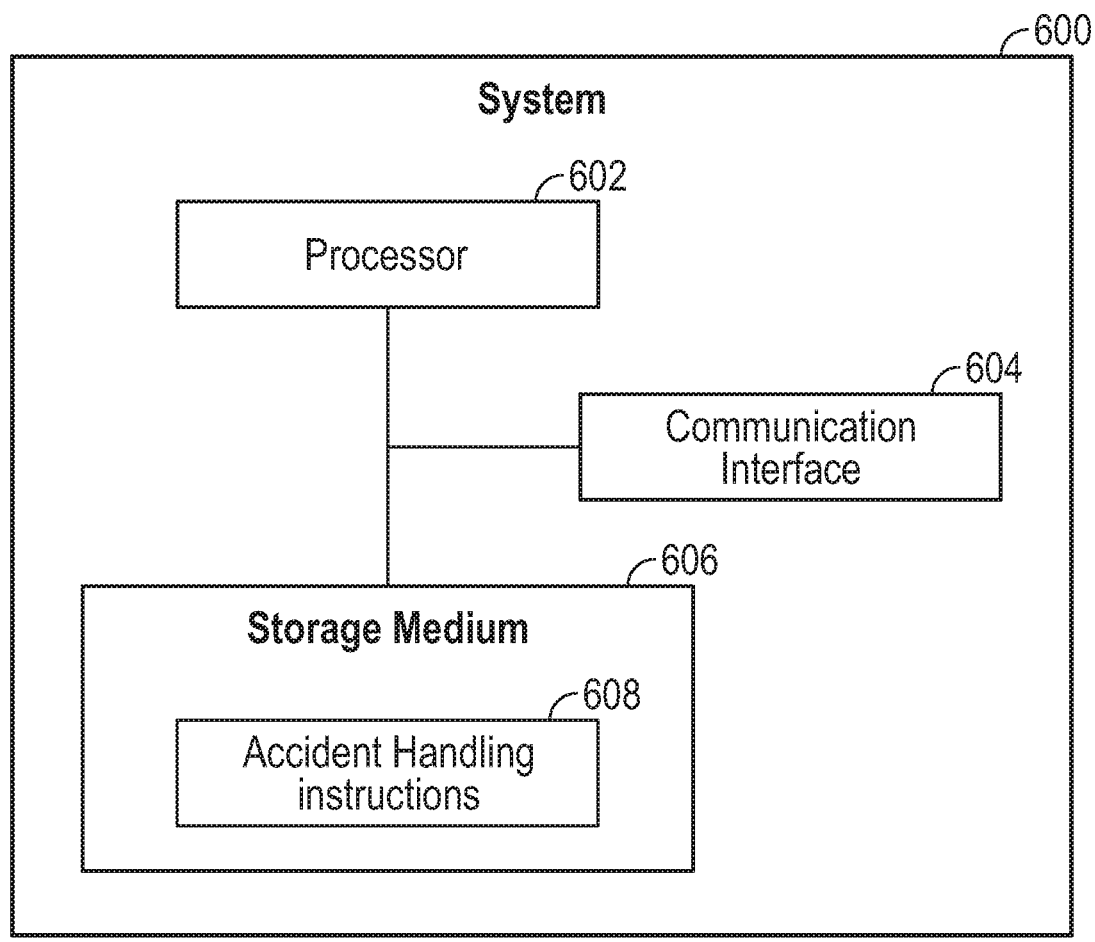
FIG. 6 is a block diagram of a system according to some implementations of the present disclosure.

FIG. 6 is a block diagram of a system 600, according to some examples. The system 600 can be the server system 119 of FIG. 1, or a vehicle or RSU.

The system 600 includes a hardware processor 602 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 600 further includes a communication interface 604 (including a transceiver and communication protocol layers) to communicate over a network, such as a wireless network.

The system 600 includes a non-transitory machine-readable or computer-readable storage medium 606 that stores machine-readable instructions executable on the hardware processor(s) 602 to perform respective tasks. The machine-readable instructions include accident handling instructions 608 to perform any of the tasks of the AIS, vehicles, or RSU discussed above.

The storage medium 606 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method performed by a system comprising a hardware processor, comprising:

detecting, by a service executed in the system, an accident involving a first vehicle, wherein the detecting is based on an accident indication received by the service over a network from a second vehicle not involved in the accident, the second vehicle different from the first vehicle, and wherein the accident indication from the second vehicle is responsive to messages received by the second vehicle from other vehicles, the messages received by the second vehicle from the other vehicles comprising temporary anonymized identifiers of the other vehicles;

in response to the detecting of the accident, verifying, by the service, that the accident occurred by sending queries to a roadside unit and a third vehicle, and receiving responses to the queries from the roadside unit and the third vehicle, the responses containing event data collected by the roadside unit and the third vehicle of events in a vicinity of the accident;

in response to the detecting of the accident, collecting, at the system, the event data and further event data relating to the accident from the second vehicle; and reconstructing, by the service, a scene of the accident based on the event data and the further event data from the second vehicle, wherein the event data and the further event data from the second vehicle comprise temporary anonymized identifiers of the second vehicle and the third vehicle.

2. The method of claim 1, wherein the further event data from the second vehicle comprises dynamic map data including a map of a roadway.

3. The method of claim 1, wherein the further event data from the second vehicle comprises data of a basic safety message (BSM).

4. The method of claim 2, wherein the further event data from the second vehicle further comprises Traveler Information Message (TIM) data including traffic information of traffic on the roadway.

5. The method of claim 1, wherein the further event data from the second vehicle comprises a radar measurement.

6. The method of claim 1, wherein the messages received by the second vehicle from the other vehicles comprise accelerometer data and image data acquired by sensors of the other vehicles, and wherein the accident indication received by the service from the second vehicle is responsive to the accelerometer data and the image data acquired by the sensors of the other vehicles.

7. The method of claim 1, wherein the reconstructing of the scene of the accident comprises reconstructing, by the service, events leading up to the accident based on the event data and the further event data from the second vehicle.

8. The method of claim 1, comprising:
in response to the detecting of the accident, sending, by the service over the network, a trigger to cause the roadside unit to record roadside unit event data relating to the accident.

9. The method of claim 8, wherein the roadside unit is to record the roadside unit event data at a higher resolution than a first resolution at which the roadside unit records event data prior to the accident.

10. The method of claim 1, wherein the further event data from the second vehicle is protected by a security mechanism.

11. The method of claim 1, comprising:
in response to the detecting of the accident, determining, by the service, an identity of the second vehicle that is not involved in the accident but was in the vicinity of the accident.

12. A system comprising:
at least one processor; and
a non-transitory storage medium storing instructions of a service executable on the at least one processor to:
detect an accident involving a first vehicle, wherein the detecting is based on an accident indication received by the service over a network from a second vehicle not involved in the accident, the second vehicle different from the first vehicle, and wherein the accident indication from the second vehicle is responsive to messages received by the second vehicle from other vehicles, the messages received by the second vehicle from the other vehicles comprising temporary anonymized identifiers of the other vehicles;

in response to the detecting of the accident, verify that the accident occurred by sending, from the service, queries to a roadside unit and a third vehicle, and receive, at the service, responses to the queries from the roadside unit and the third vehicle, the responses containing event data collected by the roadside unit and the third vehicle of events in a vicinity of the accident; and reconstruct a scene of the accident based on the event data and further event data from the second vehicle, wherein the event data and the further event data from the second vehicle comprise temporary anonymized identifiers of the second vehicle and the third vehicle.

13. The system of claim 12, wherein the further event data from the second vehicle comprises dynamic map data including a map of a roadway.

14. The system of claim 12, wherein the instructions are executable on the at least one processor to:
in response to the detecting of the accident, send, from the service to the roadside unit, a trigger to cause the roadside unit to record roadside unit event data relating to the accident, wherein the roadside unit is to record the roadside unit event data at a higher resolution than a first resolution at which the roadside unit records event data prior to the accident.

15. The system of claim 13, wherein the further event data from the second vehicle further comprises Traveler Information Message (TIM) data including traffic information of traffic on the roadway.

16. A non-transitory machine-readable storage medium comprising instructions of a service that upon execution cause a system to:
detect an accident involving a first vehicle, wherein the detecting is based on an accident indication received by the service over a network from a second vehicle not involved in the accident, the second vehicle different from the first vehicle, and wherein the accident indication from the second vehicle is responsive to messages received by the second vehicle from other vehicles, the messages received by the second vehicle from the other vehicles comprising temporary anonymized identifiers of the other vehicles;

in response to the detecting of the accident, verify that the accident occurred by sending, from the service, queries to a roadside unit and a third vehicle, and receiving, at the service, responses to the queries from the roadside unit and the third vehicle, the responses containing event data collected by the roadside unit and the third vehicle of events in a vicinity of the accident; and reconstruct a scene of the accident based on the event data and further event data from the second vehicle, wherein the event data and the further event data from the second vehicle comprise temporary anonymized identifiers of the second vehicle and the third vehicle.

* * * * *